US006824439B2

(12) United States Patent
Ammon, Jr.

(10) Patent No.: US 6,824,439 B2
(45) Date of Patent: *Nov. 30, 2004

(54) TOY BUBBLEMAKING SOLUTION

(75) Inventor: Daniel M. Ammon, Jr., Rochester, NY (US)

(73) Assignee: Heliogenesis, Inc., Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/618,199

(22) Filed: Jul. 11, 2003

(65) Prior Publication Data

US 2004/0077254 A1 Apr. 22, 2004

Related U.S. Application Data

(63) Continuation of application No. 09/892,531, filed on Jun. 28, 2001, now Pat. No. 6,593,375.
(60) Provisional application No. 60/215,615, filed on Jun. 30, 2000.

(51) Int. Cl.[7] ........................ A63H 33/28; B01F 17/02
(52) U.S. Cl. ........................ 446/15; 446/15; 516/14
(58) Field of Search ........................ 446/15, 16, 17, 446/18, 19, 20, 21; 516/14, 18

(56) References Cited

U.S. PATENT DOCUMENTS

| 2,469,045 | A | * | 5/1949 | La Vietes .................. 516/14 |
| 4,511,497 | A | * | 4/1985 | Ehrlich ...................... 516/14 |
| 5,109,127 | A | * | 4/1992 | Sekiguchi et al. ......... 514/25 |
| 6,593,375 | B2 | * | 7/2003 | Ammon, Jr. ............... 516/14 |

FOREIGN PATENT DOCUMENTS

| WO | WO 200202721 A2 * 1/2002 ............. B01F/3/04 |

* cited by examiner

*Primary Examiner*—Derris H. Banks
*Assistant Examiner*—Urszula M Cegielnik
(74) *Attorney, Agent, or Firm*—Roach Brown McCarthy & Gruber, P.C.; Kevin D. McCarthy

(57) ABSTRACT

The present invention relates to an aqueous bubble solution. The solution has at least a surfactant that produces micelles in an aqueous solution, along with an ionic, hydrophobic or hydrogen bonding agent that interacts with the surfactant. When the bubble solution is formed into a bubble the bubble provides a first predetermined effect other than just being formed and popping.

18 Claims, No Drawings

TOY BUBBLEMAKING SOLUTION

The present invention claims priority as a continuation application of U.S. Ser. No. 09/892,531, filed on Jun. 28, 2001 now U.S. Pat. No. 6,593,375, which claims priority to U.S. provisional patent application Ser. No. 60/215,615, filed on Jun. 30, 2000.

FIELD OF THE INVENTION

The present invention relates to a solution for making bubbles.

BACKGROUND OF THE INVENTION

A bubble may be defined as a small volume of gas contained within a thin liquid spherical envelope. Bubble-making toys and devices are well known, and numerous toys and related products of this type are available commercially due to the popularity of these devices with children. A common operating principle of these toys or devices is that one or more openings is provided, such as the ring-end of a wand device upon which a soapy bubble-forming solution film is formed by immersion or other means. Surface tension causes the bubble solution to form the film across the opening, and upon application of a sufficient force or gas pressure upon one side of the film, a bubble is formed and expelled from the opening in the direction in which the force is exerted.

Bubble-forming devices can range from the most basic, such as the above-described wand having the ring at one end for dipping into a bubble solution, to more sophisticated devices such as mechanized bubble-producing toys that may include pumps or other features designed to facilitate production of bubbles by the user. Examples of mechanized or complex bubble-producing devices are described in U.S. Pat. Nos. 6,024,623, 5,908,057, 5,879,218, 5,746,636, 5,704,821, 5,695,379, 5,613,890, and 5,603,651, to name but a few. Other bubble-producing toys, for example a bubble-forming lawn mower-style device sold by Fisher-Price.RTM., are also available commercially.

Improvements in the art of bubblemaking toys to date have focused on modifications to the bubblemaking device itself rather than to the bubblemaking solution. For example, the device described in U.S. Pat. No. 6,024,623 includes a frustoconical surface having a precise upward angle of about 30 degrees to prevent bubbles exiting the aperture from contacting the handle and bursting prematurely. The problem of bubble bursting immediately upon contact with a solid object or surface including that of the device itself can therefore necessitate specific product design efforts to minimize the undesirable effect. This leads to increased product development cost, increased design complexity, and increased tooling and manufacturing costs.

A typical toy bubble solution contains water mixed with one or more soaps. The soap has the effect of decreasing the surface tension of the water so that when a ring or similarly apertured surface is immersed or otherwise contacted with the solution, a film is formed across the opening. A gas, generally air, is pushed or forced against one surface of the film, which displaces the film from the apertured surface and produces a free-floating bubble.

SUMMARY OF THE INVENTION

The present invention relates to an aqueous bubble solution. The solution has at least a surfactant that produces micelles in an aqueous solution, along with an ionic, hydrophobic or hydrogen bonding agent that interacts with the surfactant. When the bubble solution is formed into a bubble the bubble provides a first predetermined effect other than just being formed and popping.

DETAILED DESCRIPTION OF THE INVENTION

The bubble solution of the present invention forms bubbles having good integrity and that are relatively long-lasting. Unlike prior art formulations, when bubbles produced according to this invention burst the resulting product is an integral or cohesive strand, drop, or sheet. The resulting product provides an interesting and unique appearance to the user. These drops, strands, or sheets may have anywhere from a white appearance to a transparent one, with the color depending on factors such as the presence of water remaining in the bubble at the time of rupture and/or the presence and concentration of other ingredients in the bubble solution. The improved bubbles also tend to opacify and phase change from a liquid (phase) bubble to a solid (phase) bubble without bursting. The use of the term "solid" in the preceding statement and as used below is meant to describe the phase change, or reverse phase change, that occurs with some liquids. For example, when a Pluronics F127 solution is heated, it gels rather than to a gas as with most liquids. The transition may alternatively be described as from a liquid bubble to a solid plastic. This solid bubble sometimes bursts and creates a "parachute" effect.

The bubble solution of the invention may be used with any simple or complex bubblemaking device, machine, or other bubblemaking apparatus to produce bubbles having the improved characteristics and appearance.

In one embodiment, a bubble solution according to the invention includes water and a soap or mixture of soaps, for example, each soap having a carbon chain of from about 12 to about 18 carbon atoms and including a water-soluble polar end such as —COONa or $SO_3Na$ and a non-polar, oil-soluble end. The bubble solution further includes a water-soluble polymer of 500 daltons or more or polymer surfactant having a molecular weight of 500 daltons or more and having both hydrophilic and hydrophobic portions.

The water-soluble polymer may comprise one or more of the following polymers: poly(N,N-dimethyl acrylamide (pDMA)), poly(2-hydroxyethyl methacrylate (pHEMA)), poly(glycerol methylacrylate), poly(2-hydroxyethyl methacrylamide), polyethleneglycol, poly(methacrylic acid), poly(acrylic acid), poly(N-vinyl pyrolidone) (PVP), poly(N-vinyl-N-methyl acetamide), poly(N-vinyl-N-ethyl acetamide), poly(N-vinyl-N-ethyl formamide) and poly(N-vinyl formamide). The polymers can also be co-polymers or terpolymers or the like, that is, polymers composed from the monomeric unit of the polymers just described.

The surfactant can be selected from a cationic, anionic, zwitterionic, or nonionic surfactant or combinations thereof, and can be either polymeric or non-polymeric. The polymer surfactants have hydrophilic and hydrophobic portions; co-(ethylene oxide, proplene oxide) (Pluronics.RTM. polymer by BASF), co-(ethylene oxide, proplene oxide)-ethylenediamine (Tetronics.RTM. polymer by BASF). A polymer as described above may be present with or without the surfactant.

The water soluble polymer preferably comprises from about 1% to about 90% by weight but most preferred 10–50% by weight or surfactant component preferably comprises from about 1% to about 90% by weight but most preferred 10–30% in the bubble solution.

The bubble solution optionally includes suitable viscosity-inducing components, thickening agents, or emulsions that include hydrophobic molecules, including but not limited to glycerin, water-soluble natural gums, and cellulose-derived polymers and the like. For example, the presence of glycerin in the solution has been noted as contributing to extending the life of a bubble, such as is described in U.S. Pat. No. 5,613,890.

Useful natural gums include guar gum and gum traganth and the like. Useful cellulose-derived polymers include hydroxypropyl cellulose, hydroxypropylmethyl cellulose, carboxymethyl cellulose, methyl cellulose, and hydroxyethyl cellulose, and the like. The viscosity-inducing or thickening agent is preferably selected from cellulose derivatives (polymers) and mixtures thereof.

Useful polymer surfactants suitable as the surfactant component in the bubble solution according to the invention include those described in U.S. Pat. No. 5,177,165, as follows.

The terms "(meth)acrylate" or "(meth)acrylamide" denote methyl substitution and therefore includes both methyl acrylate and methyl methacrylate, while N-alkyl (meth)acrylamide includes both N-alkyl acrylamide and N-alkyl methacrylamide.

Surfactant copolymers useful in the invention are prepared by copolymerizing at least one ethylenically unsaturated hydrophobic monomer and at least one ethylenically unsaturated hydrophilic monomer in the presence of a functional chain transfer agent. Preferred copolymers have the formula:

$$C[A_xB_y]$$

wherein A is at least one ethylenically unsaturated hydrophilic monomer, B is at least one ethylenically unsaturated hydrophobic monomer, C is a functional chain transfer agent, y is within the range of about 0.1 to about 0.9, and x+y=b 1.

Suitable ethylenically unsaturated hydrophilic monomers ("A" in the above formula) include ethylenically unsaturated polyoxyalkylenes, polyacrylamides, polyvinylpyrrolidones, polyvinyl alcohols, poly (hydroxyethyl methacrylate) or poly (HEMA), and N-alkyl-N-vinyl acetamides. Ethylenic unsaturation may be provided by (meth)acrylate, (meth)acrylamide, styrenyl, alkenyl, vinyl carbonate and vinyl carbamate groups. Preferred hydrophilic macromonomers include methoxypolyoxyethylene methacrylates of molecular weights from 200 to 10,000, more preferred are methoxypolyoxyethylene methacrylates of molecular weight range of 200 to 5,000 and most preferred are methoxypolyoxyethylene methacrylates of molecular weight range of 400 to 5,000. Additional preferred hydrophilic macromonomers include poly-N-vinylpyrrolidone methacrylates of molecular weights of 500 to 10,000. More preferred are poly-N-vinylpyrrolidone methacrylates of molecular weights of 500 to 5,000 and most preferred are poly-N-vinylpyrrolidone methacrylates of molecular weights of 1000 to 5,000. Other preferred hydrophilic macromonomers include poly-N,N-dimethyl acrylamide methacrylates of molecular weights of 500 to 10,000. More preferred are poly-N,N-dimethyl acrylamide methacrylates of molecular weights of 500 to 5,000 and most preferred are poly-N,N-dimethyl acrylamide methacrylates of molecular weights of 1000 to 5,000.

Suitable ethylenically unsaturated hydrophobic monomers ("B" in the above formula) include alkyl (meth)acrylates, N-alkyl (meth)acrylamides, alkyl vinylcarbonates, alkyl vinylcarbamates, fluoroalkyl (meth)acrylates, N-fluoroalkyl (meth)acrylamides, N-fluoroalkyl vinylcarbonates, N-fluoroalkyl vinylcarbamates, silicone-containing (meth)acrylates, (meth)acrylamides, vinyl carbonates, vinyl carbamates, styrenic monomers [selected from the group consisting of styrene, alpha-methyl styrene, paramethyl styrene, para-t-butyl monochloro styrene, and para-t-butyl dichloro styrene] and polyoxypropylene (meth)acrylates. Preferred hydrophobic monomers include methyl methacrylate, dodecyl methacrylate, octafluoropentyl methacrylate, perfluorooctyl methacrylate, methacryoyl oxypropyl tris(trimethylsiloxy)silane (TRIS).

The functional chain transfer agent ("C" in the above formula) controls the molecular weight of the copolymer. Suitable functional chain transfer agents include mercapto carboxylic acids, mercapto alcohols (also known as hydroxymercaptans), and aminomercaptans. Preferred chain transfer agents include thioglycolic acid, 2-mercaptoethanol and 2-aminoethane thiol. The molar ratio of chain transfer agent to total monomer content used in the copolymerization is preferably in the range of 0.01 to 3, more preferably in the range of 0.02 to 2, and still more preferably in the range of 0.05 to 1.

Suitable surface active macromonomers of the invention are described by the formula:

$$DC[A_xB_y]$$

wherein A, B, C, x and y are as described above and D is an ethylenically unsaturated end group. Selection of the ethylenically unsaturated end group ("D" in the above formula) is determined by the functional group of the functional chain transfer agent. For example, if the chain transfer agent contains a carboxylic acid group, glycidyl methacrylate can provide a methacrylate end group. If the chain transfer agent contains hydroxy or amino functionality, isocyanato ethyl methacrylate or (meth)acryloyl chloride can provide a methacrylate end group and vinyl chloro formate can provide a vinyl end group.

Suitable hydrophilic monomers include water soluble monoesters of (meth)acrylic acid with an alcohol having an esterifiable hydroxyl group and at least one additional hydroxyl group such as the mono- and polyalkylene glycol monoesters of (meth)acrylic acid, e.g., ethylene glycol mono (meth)acrylate, diethylene glycol mono(meth)acrylate, propylene glycol mono(meth)acrylate, dipropylene glycol mono(meth)acrylate, and the like; the N-alkyl and N,N-dialkyl substituted (meth)acrylamides such as N-methyl (meth)acrylamide, N,N-dimethyl (meth)acrylamide, and the like; N-vinylpyrrolidone and the alkyl substituted N-vinyl pyrrolidones; glycidyl (meth)acrylates; the unsaturated amines; the alkoxy ethyl acrylates; mixtures thereof; and the like.

Suitable di- or higher polyfunctional species cross-linking agents include divinylbenzene, ethylene glycol di(meth)acrylate, propylene glycol di(meth)acrylate, and the (meth)acrylate esters of polyols such as triethanolamine, glycerol, pentaerythritol, butylene glycol, diethylene glycol, triethylene glycol, tetraethylene glycol, mannitol, and sorbitol, N,N-methylene-bis-(meth)acrylamide, sulfonated divinylbenzene, and divinylsulfone.

The soap component of the bubble solution may comprise a commercially available product such as Miracle Bubble.RTM., Ultra Dawn.RTM., or Ultra Palmolive.RTM. and may comprise one of the following commercially available formulations, and which are further described in U.S. Pat. No. 5,415,814.

The soap formulation may include a surfactant, with or without a surfactant and/or polymer as described above, and a source of calcium ions in the form of calcium xylene sulfonate, calcium chloride with sucrose optionally included for stability. The surfactant, present in an amount of from about 20% to about 95% by weight, may comprise an anionic surfactant with an associated cation selected from an alkali metal, ammonium, mono-, di-, and tri-ethanolammonium, such as sodium, potassium, ammonium and mixtures thereof. Suitable anionic surfactants include (a) alkyl benzene sulfonates in which the alkyl group contains from 9 to 15 carbon atoms, preferably 11 to 14 carbon atoms in straight chain or branched chain configuration; (b) alkyl sulfates obtained by sulfating an alcohol having 8 to 22 carbon atoms, preferably 12 to 16 carbon atoms, and described by the formula $ROSO_3$—$M^+$ where R is a $C_{8-22}$ alkyl group and M is a mono- and/or divalant cation; (c) paraffin sulfonates having 8 to 22 carbon atoms, preferably 12 to 16 carbon atoms, in the alkyl moiety, and commercially available as Hostapur SAS from Hoechst Celanese; (d) olefin sulfonates having 8 to 22 carbon atoms, preferably 12 to 16 carbon atoms; (e) alkyl ether sulfates derived from ethoxylating an alcohol having 8 to 22 carbon atoms, preferably 12 to 16 carbon atoms, less than 30, preferably less than 12, moles of ethylene oxide, and described by the formula $RO(C_2H_4O)_xSO_3$—$M^+$ where R is a $C_{8-22}$ alkyl group, x is 1–30, and M is a mono- or divalent cation; (f) alkyl glyceryl ether sulfonates having 8 to 22 carbon atoms, preferably 12 to 16 carbon atoms, in the alkyl moiety; (g) fatty acid ester sulfonates of the formula $R_1$—$CH(SO_3$—$M^+)$—$CO_2R_2$ wherein $R_1$ is straight or branched alkyl from about $C_8$ to $C_{18}$, preferably $C_{12}$ to $C_{16}$, and $R_2$ is straight or branched alkyl from about $C_1$ to $C_6$, preferably primarily $C_1$, and $M^+$ represents a mono- or divalent cation; (h) secondary alcohol sulfates having 6 to 18, preferably 8 to 16 carbon atoms; (i) alkyl diphenyl oxide disulfonate surfactants of the general formula:

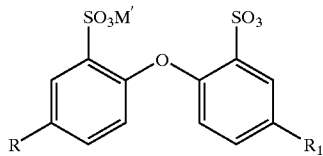

R=$C_{10}$–$C_{18}$, may be branched or linear, $R_1$=H or R, $M^1$=$Na^+$, $K^+$, $NH_4^+$, $Ca^{++}$, or $Mg^{++}$; and

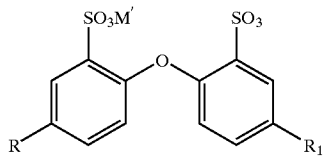

R=$C_{10}$–$C_{18}$, may be branched or linear, $R_1$=H or R, $M^1$=$Ca^{++}$ or $Mg^{++}$. Suitable series from Dow Chemical (Dowfax 2A1, 3B2, 8290) and the POLY-TERGENT.RTM. series from Olin Corp., preferably in an amount from about 0.5% to about 40% by weight.

Other suitable polymers include $C_{10}$-$C_{16}$ secondary carboxyl materials of the formula $R^3CH(R^4)COOM$, wherein $R^3$ is $CH_3(CH_2)_x$, and $R^4$ is $CH_3(CH_2)_y$, wherein y can be 0 or an integer from 1 to 6, x is an integer from 6 to 12 and the sum of (x+y) is 6–12, preferably 7–11, most preferably 8–9; carboxyl compounds wherein the carboxyl substituent is on a ring hydrocarbyl unit, i.e., secondary soaps of the formula $R^5$—$R^6$—$COOM$, wherein $R^5$ is $C_7$–$C_{10}$, preferably $C_8$–$C_9$, alkyl or alkenyl and $R^6$ is a ring structure, such as benzene, cyclopentane, cyclohexane, and the like, and where $R^5$ may be in the ortho, meta or para position relative to the carboxyl on the ring; $C_{10}$–$C_{18}$ primary and secondary carboxyl compounds of the formula $R^7CH(R^8)COOM$, wherein the sum of the carbons in $R^7$ and $R^8$ is 8–16, $R^7$ is of the form $CH_3(CHR^9)_x$ and $R^8$ is of the form $H(CHR^9)_y$, where x and y are integers in the range 0–15 and $R^9$ is H or a $C_{1-4}$ linear or branched alkyl group, $R^9$ is any combination of H and $C_{1-4}$ linear or branched alkyl group members within a single —$(CHR^9)_x$, y group, while each molecule should contain at least one $R^9$ that is not H; $C_{10}$–$C_{18}$ tertiary carboxyl compounds, e.g., neo-acids, of the formula $R^{10}CR^{11}(R^{12})COOM$, wherein the sum of the carbons in $R^{10}$, $R^{11}$ and $R^{12}$ is 8°16, $R^{10}$, $R^{11}$, and $R^{12}$ are of the form $CH_3$—$(CHR^{13})_x$, where x is an integer in the range 0°13, and $R^{13}$ is H or a $C_{1-4}$ linear or branched alkyl group, and R.sup.13 is any combination of H and $C_{1-4}$ linear or branched alkyl group members within a single —$(CHR^{13})_x$ group: suitable commercially available such compounds include the neodecanoic acid manufactured by Exxon and the Versatic.RTM. acids manufactured by shell, and mixtures thereof. In the above formulas, "M" is any suitable counterion, e.g., H, alkali metal, alkaline earth metal, ammonium, alkanolammonium, di- and tri-alkanolammonium, $C_1$–$C_5$ alkyl substituted ammonium and the like.

Suitable nonionic detergent surfactants include the polyethylene, polypropylene, and polybutylene oxide condensates of alkyl phenols, including Igepal.TM. CO-630, marketed by the GAF Corporation; and Triton.TM. X-45, X-114, X-100, and X-102, all marketed by the Rohm & Haas Company; the condensation products of aliphatic alcohols with from about 1 to about 25 moles of ethylene oxide; the condensation products of ethylene oxide with a hydrophobic base formed by the condensation of propylene oxide with propylene glycol, the hydrophobic portion of these compounds preferably having a molecular weight of from about 1500 to about 1800 and exhibiting water insolubility; the condensation products of ethylene oxide with the product resulting from the reaction of propylene oxide and ethylenediamine; alkylpolysaccharides and alkylpolysaccharides having a hydrophobic group containing from about 6 to about 30 carbon atoms and a polysaccharide, e.g., a polyglycoside, hydrophilic group containing from about 1.3 to about 10 saccharide units; alkyl ethoxy carboxylates of the formula $RO(CH_2CH_2O)_xCH_2COO$—$M^+$ wherein R is a $C_{12}$ to $C_{16}$ alkyl group, x ranges from 0 to about 10, and having an ethoxylate distribution by weight that when x is 0 is less than about 20% and when x is greater than 7 is less than about 25%, the average x is from about 2 to 4 when the average R is $C_{13}$ or less, and the average x is from about 3 to 6 when the average R is greater than $C_{13}$, and M is a cation, preferably chosen from alkali metal, ammonium, mono-, di-, and tri-ethanolammonium, most preferably from sodium, potassium, ammonium, and mixtures thereof with magnesium ions.

Another suitable composition includes a polyhydroxy fatty acid amide surfactant of the structural formula:

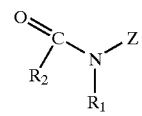

wherein: $R^1$ is H, $C_1$–$C_4$ hydrocarbyl, 2-hydroxy ethyl, 2-hydroxy propyl, or a mixture thereof, and $R^2$ is a $C_5$–$C_{31}$ hydrocarbyl, and Z is a polyhydroxyhydrocarbyl having a linear hydrocarbyl chain with at least 3 hydroxyls directly connected to the chain, or an alkoxylated derivative thereof. Other ampholytic surfactants may also be included in the compositions.

Another suitable composition includes alkyl amphocarboxylic acids of the formula:

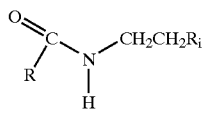

wherein R is a $C_8$–$C_{18}$ alkyl group, and $R_1$ is of the general formula:

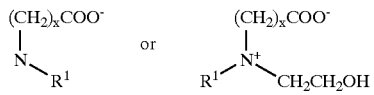

wherein $R^1$ is a $(CH_2)_xCOOM$ or $CH_2CH_2OH$, and x is 1 or 2 and M is preferably chosen from alkali metal, alkaline earth metal, ammonium, mono-, di-, and tri-ethanolammonium, most preferably from sodium, potassium, ammonium, and mixtures thereof with magnesium ions. The preferred R alkyl chain length is a $C_{10}$ to $C_{14}$.sub.14 alkyl group. Suitable such alkyl amphodicarboxylic acids include the amphoteric surfactant Miranol.RTM, and .C2M Conc. manufactured by Miranol, Inc., Dayton, N.J.

Another suitable composition includes a zwitterionic surfactant, e.g., derivatives of secondary and tertiary amines, derivatives of heterocyclic secondary and tertiary amines, or derivatives of quaternary ammonium, quaternary phosphonium or tertiary sulfonium compounds. Ampholytic and zwitterionic surfactants are generally used in combination with one or more anionic and/or nonionic surfactants. If included in the compositions of the present invention, these additional surfactants are typically present at a concentration of from about 1% to about 15%, preferably from about 2% to about 10% by weight of the composition. The composition may further include a buffering agent, e.g., an amino acid, a lower alcohol amine, 2-amino-2-ethyl-1,3-propanediol, 2-amino-2-methylpropanol, 2-amino-2-methyl-1,3-propanediol, tris-(hydroxymethyl)aminomethane (a.k.a. tris) and disodium glutamate, N-methyl diethanolamine, 1,3-diamino-2-propanol N,N'-tetramethyl-1,3-diam-ino-2-propanol, N,N-bis(2-hydroxyethyl)glycine (a.k.a. bicine), and N-tris (hydroxymethyl)methyl glycine (a.k.a. tricine), and mixtures thereof, at a level of from about 0.1% to 15% by weight.

A saccharide may be included in an amount from about 0.1% to about 5.0% by weight, e.g., sucrose, cellobiose, lactulose, maltose (malt sugar), lactose, gluconic acid, glucose, fructose, galactose, xylose, arabinose and ribose. The composition of this invention can also contain a certain cationic quarternary ammonium surfactants, magnesium ions in amounts from about 0.01% to about 4%, alcohols such as ethyl alcohol and propylene glycol at a level of from 0% to about 15%, diluents such as ammonium chloride, sodium chloride, potassium chloride, etc., and solvents including water, lower molecular weight alcohols, such as ethyl alcohol, isopropyl alcohol, etc. Compositions herein will typically contain up to about 45%, preferably from about 20% to about 40%, most preferably from about 25% to about 35%, of water.

Another suitable formulation as described for the product UltraPalmolive.RTM., which is: water, ammonium laureth sulfate, lauryl polyglucose, sodium and magnesium, dodecylbenzenesulfonate, SD alcohol 3A, sodium xylenesulfonate, lauramide/myristamide MEA, sodium chloride, fragrance, trisodium HEDTA, and D&C orange no 4.

In addition, the addition of a conventional dye can alter the strand, drop, or sheet, or color of the bubble to a predetermined color. The application of such dyes to surfactant compositions are well known to those skilled in the art.

The invention will be further illustrated by the following examples of its practice.

COMPARATIVE EXAMPLE

A commercially available bubble-forming solution, Miracle Bubble.RTM., was tested using a toy bubble-blowing wand six inches long with a ½ inch ring. Bubbles were formed in accordance with the manufacturer's instructions and their longevity measured. It was observed that the bubbles varied in size and maintained their integrity from between about 1 second to about 60 seconds before popping, generally after floating and then bursting upon contact with a dry object. It was also observed that upon bursting the bubble components were not readily or easily visible to the naked eye.

EXAMPLE 1

40 ml of Miracle Bubble.RTM. was mixed with 60 ml of water and 10 grams of Pluoronics F127 at room temperature to prepare a bubble-forming solution in accordance with the invention. Bubbles were formed as in the process of the Comparative Example, above. It was observed that the bubbles varied in size and maintained integrity from about 1 second to about 600 seconds, and a substantial fraction of those that floated into contact with a dry object did not immediately burst upon contact with the object unlike the bubbles of the comparative example. It was also observed that upon bursting the bubbles formed white drops, strands, or sheets. Bubbles occasionally phase changed from a liquid bubble to a solid in accordance with the use of Pluronics, which has the special property of undergoing under certain conditions of reverse phase change where the liquid bubble turns to a solid, opaque bubble. When the solid bubbles burst they create a parachute effect.

EXAMPLE 2

40 ml of ULTRA Dawn.RTM. was mixed with 60 ml of deionized water and 18 grams of Pluoronics F127 at room temperature to prepare a bubble-forming solution in accordance with the invention. Bubbles were formed as in the process set forth in the Comparative Example. It was observed that the bubbles varied in size and maintained integrity from about 1 second to about 600 seconds, and a substantial fraction of those that floated into contact with a dry object did not immediately burst upon contact with the object unlike the bubbles of the comparative example. It was also observed that upon bursting the bubbles formed white drops, strands, or sheets. Bubbles occasionally phase changed from a liquid bubble to a solid bubble. The solid bubbles sometimes burst creating a parachute effect.

EXAMPLE 3

A composition was prepared using an Oil of Olay Daily Renewal Moisturizing Body Wash.RTM. (10–100%)

emulsion, having the formulation water, ammonium laureth sulfate, sodium lauroamphoacetate, ammonium lauryl sulfate, lauric acid, fragrence, trihydroxysterin, citric acid, guar hydroxypropyl trimonium chloride, sodium benzoate, DMDM hydantoin, disodium EDTA, PEG-14m, by mixing with water (0–90%). Bubbles were formed as in the Comparative Example. It was observed that bubbles were less likely to form than in the above examples, although upon bursting large and visually striking strands were formed.

Additional examples of the present bubble formulations' components are as follows:

| Example 4 | 50 grams Sodium laureth sulfate $(EO)_3$ |
| | 50 grams Deionized water |
| | 1 gram EDTA |
| | 3 grams Calcium Chloride |
| Example 5 | 50 grams Sodium laureth sulfate $(EO)_3$ |
| | 50 grams Deionized water |
| | 1 gram EDTA |
| | 3 grams Calcium Chloride |
| | 15 grams Pluronic F127 |
| Example 6 | 50 grams Sodium laureth sulfate $(EO)_3$ |
| | 50 grams Deionized water |
| | 1 gram EDTA |
| | 3 grams Calcium Chloride |
| | 15 grams Pluronic F127 |
| | 10 grams Cocamidopropyl betaine (10% solution) |
| Example 7 | 50 grams Sodium laureth sulfate $(EO)_3$ |
| | 50 grams Deionized water |
| | 1 gram EDTA |
| | 3 grams Calcium Chloride |
| | 0.3 grams Cationic cellulose |
| Example 8 | 50 grams Sodium laureth sulfate $(EO)_3$ |
| | 50 grams Deionized water |
| | 1 gram EDTA |
| | 3 grams Calcium Chloride |
| | 0.3 grams Cationic cellulose |
| | 15 grams Pluronic F127 |
| Example 9 | 50 grams Sodium laureth sulfate $(EO)_3$ |
| | 50 grams Deionized water |
| | 1 gram EDTA |
| | 3 grams Calcium Chloride |
| | 0.3 grams Cationic cellulose |
| | 15 grams Pluronic F127 |
| | 10 grams Cocamidopropyl betaine (10% solution) |
| Example 10 | 50 grams Sodium laureth sulfate $(EO)_3$ |
| | 50 grams Deionized water |
| | 0.3 grams EDTA |
| | 3 grams Calcium Chloride |
| | 0.3 grams Cationic cellulose |
| | 10 grams Pluronic F127 |
| | 10 grams Cocamidopropyl betaine (10% solution) |
| | 0.12 grams Calcium hydroxide |
| Example 11 | 50 grams Sodium laureth sulfate $(EO)_3$ |
| | 50 grams Deionized water |
| | 0.3 grams EDTA |
| | 3 grams Calcium Chloride |
| | 0.3 grams Cationic cellulose |
| | 18 grams Tetronic 1107 |
| | 10 grams Cocamidopropyl betaine (10% solution) |
| | 0.12 grams Calcium hydroxide |

Applicant can also add sorbic acid to examples 4–11 without effecting the present invention. The above examples can be inversed as well wherein each substituent is substituted with the polar opposite component, for example a cationic surfactant for a anionic surfactant. Such substitution will obtain the desired, predetermined effect as well. For a further understanding of the present invention, the applicant has disclosed the functionality of the components of examples 4–11. The functionality of each of these components is as follows:

Sodium laureth (ethylene oxide)$_3$ sulfate (CAS#9004-82-4) is a surfactant used to produce the bubbles. This anionic surfactant produces micelle in solution that can be ionically cross-linked. The micelles can be cross-linked with cationic molecules (di-cationic to polycationic molecules) or atoms like calcium that are +2 charged (more highly positively charged species will also work). This cross-linked system is called a network (like a polymer network). When the surfactant concentration is 5.0% or greater and the micelles are cross-linked with the cationic species mentioned above, the liquid bubbles can transform to a "solid bubble" (film) or implode to produce a "snow flake effect" or "confetti effect". As the concentration of the surfactant increase, so does the observed effect. Other anionic surfactants, for example those cited above, can be substituted for the sodium laureth sulfate.

Sorbic acid is an antimicrobial agent to maintain the surfactant's desired properties.

EDTA (Ethylenediaminetetraacetic Acid) provides two functions to the present invention. First, it provides antimicrobial action in addition to the sorbic acid. Second, since this molecule contains 4 acid groups (negatively charged groups), it can also aid in ionic cross-linking, in the presence of the multi-cationic species, with another EDTA molecule or the anionic micelles, to form the network.

Calcium hydroxide and other basic compounds also have at least two functions. Those functions are (a) control pH (optimal pH 3.0–8.5) of the solution (other bases could be used to control the pH), (b) a cross-linker with the EDTA or the anionic micelles to form a network, and (c) increasing the viscosity of the solution. The cross-linked network forms the film.

De-ionized water is used as the preferred solvent. Uncontrolled salt concentrations can cause some of the ingredients to precipitate.

Calcium chloride is added after the appropriate pH is obtained with Ca(OH)$_2$ because the present invention usually requires more Ca$^{+2}$ to further the cross-linked network. The calcium chloride also increases the viscosity of the bubble composition. A useful calcium chloride concentration ranges between 0% (if you use other polycationic species) to just below an upper concentration in which the calcium forms a network that gels during mixing. Gel formation concentration depends on the other components concentrations.

The cationic cellulose performs many functions. One of those functions is to increases the viscosity of the bubble composition. Another function is that since each cellulose molecule contains many positive charges, it can also cross-link the negative components in the bubble composition to form networks. Since the distance between the positively charged groups on the cellulose molecule are further apart, when compared to the calcium ions, this molecule makes the bubbles more elastic. This increase in elasticity allows more bubbles to be produced with the bubble wand or bubble toy.

Either the Ca$^{+2}$ ions from calcium hydroxide and calcium chloride can be used to form a cross-linked network with the anionic molecules or the cationic cellulose can be used. It is preferred that both be used in the same formulation. The Ca$^{+2}$ containing salts can be used with other viscosity enhancers, like other neutral celluloses or even anionic celluloses, as set forth above.

Polymer surfactants have a few roles in the present invention. First, they act as filler when the bubble bursts. For example, the snow or confetti effect is enhanced by the polymer surfactant. Second, some polymer surfactants have reverse phase behaviors. They transform from a liquid to a solid at certain concentrations when you heat then up.

Typically, when a liquid is heated it turns into a gas. This reverse phase behavior is due to hydrophobic association of the polymer surfactants in solution. These polymer surfactants, for example pluronic and tetronic polymer surfactants from BASF are discussed above. The reverse phase behavior and other polymer properties can cause the desired effect.

The bubble stabilizers are Zwitter-ionic surfactants, and/or cationic surfactants. Each surfactant type increases the viscosity of the bubble, increases the stability of the bubble (i.e., last longer and stronger), and increases the shelf life of the product.

The invention has been described in detail with particular reference to preferred embodiments thereof, but it will be understood that variations and modifications can be affected within the spirit and scope of the invention.

We claim:

1. An aqueous bubble solution comprising at least a first and a second water soluble polymers wherein the first and second water soluble polymers are distinct from each other; each water soluble polymer interacts (a) ionicly, (b) hydrophobicly, and/or (c) at least one hydrogen bond, with the at least second water soluble polymer;

wherein when the bubble solution is formed into a bubble the bubble provides a first predetermined effect based on the interaction between the first and second water soluble polymers other than the bubble being formed and then bursting.

2. The bubble solution of claim 1 wherein the first and second water soluble polymers are distinct by having an average molecular weight difference of greater than 10,000 daltons.

3. The solution of claim 1 wherein the first predetermined effect is the formation of strands, drops, and sheets once the bubble bursts.

4. The solution of claim 1 wherein the surfactant composition is selected from the group consisting of a cationic surfactant, a zwitterionic surfactant, and an anionic surfactant.

5. The solution of claim 3 wherein the strands, drops, and sheets are white.

6. The solution of claim 3 wherein the solution further comprises a coloring agent, and the strands, drops and sheets are the color of the coloring agent.

7. The solution of claim 1 wherein the first predetermined effect is a phase transition of the bubble.

8. The solution of claim 7 further comprising a second predetermined effect.

9. The solution of claim 8 wherein the second predetermined effect is the formation of strands, drops, and sheets once the bubble bursts.

10. The solution of claim 1 wherein the first predetermined effect is the formation of strands, drops, and sheets once the bubble bursts.

11. The solution of claim 1 further comprising a bubble stabilizer.

12. A method of forming a toy bubble comprising: forming a film on a bubble making apparatus with an aqueous bubble solution comprising at least a first and a second water soluble polymers wherein the first and second water soluble polymers are distinct from each other; and each water soluble polymer interacts (a) ionicly, (b) hydrophobicly, and/or (c) at least one hydrogen bond, with the at least second water soluble polymer;

creating a bubble from the film wherein bubble provides a first predetermined effect based on the interaction between the first and second water soluble polymers other than the bubble being formed and then bursting.

13. The method of claim 12 wherein the first and second water soluble polymers are distinct by having an average molecular weight difference of greater than 10,000 daltons.

14. The method of claim 12 wherein the first predetermined effect is the formation of strands, drops, and sheets once the bubble bursts.

15. The method of claim 12 wherein the first predetermined effect is a phase transition of the bubble.

16. The method of claim 15 further comprising a second predetermined effect.

17. The method of claim 16 wherein the second predetermined effect is the formation of strands, drops, and sheets once the bubble bursts.

18. The method of claim 12 wherein the first predetermined effect is the formation of strands, drops, and sheets once the bubble bursts.

* * * * *